May 8, 1923.  
W. T. HARRIS ET AL  
COTTON PICKING MACHINE  
Filed Jan. 6, 1922
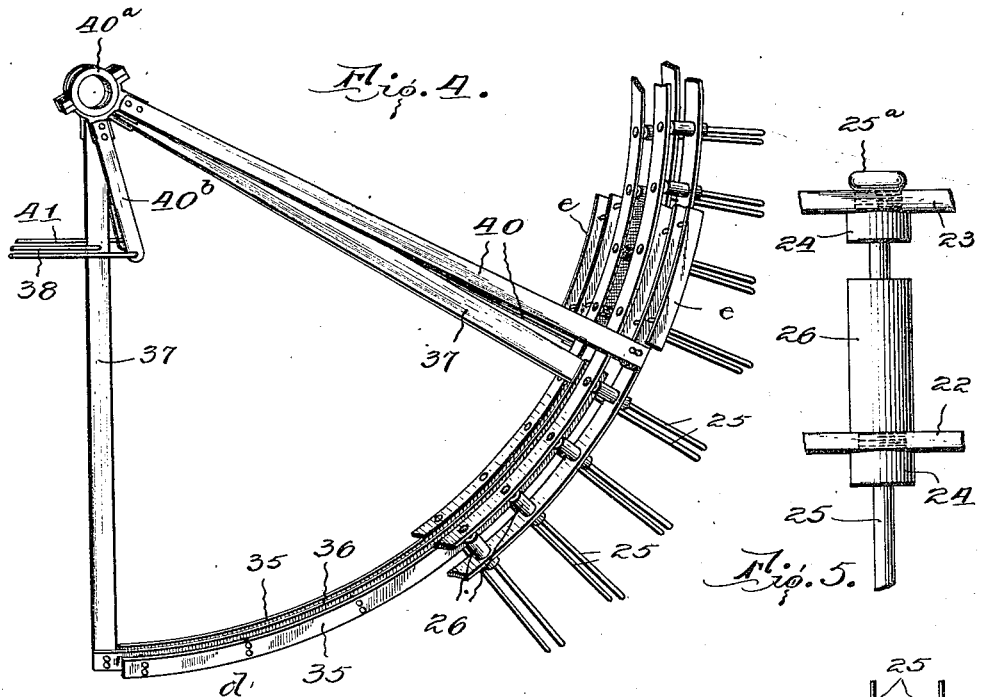
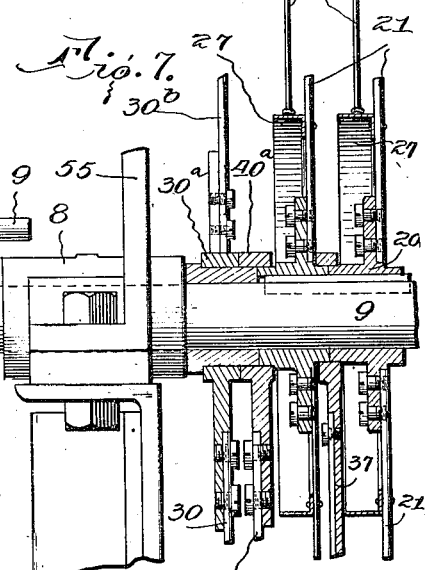
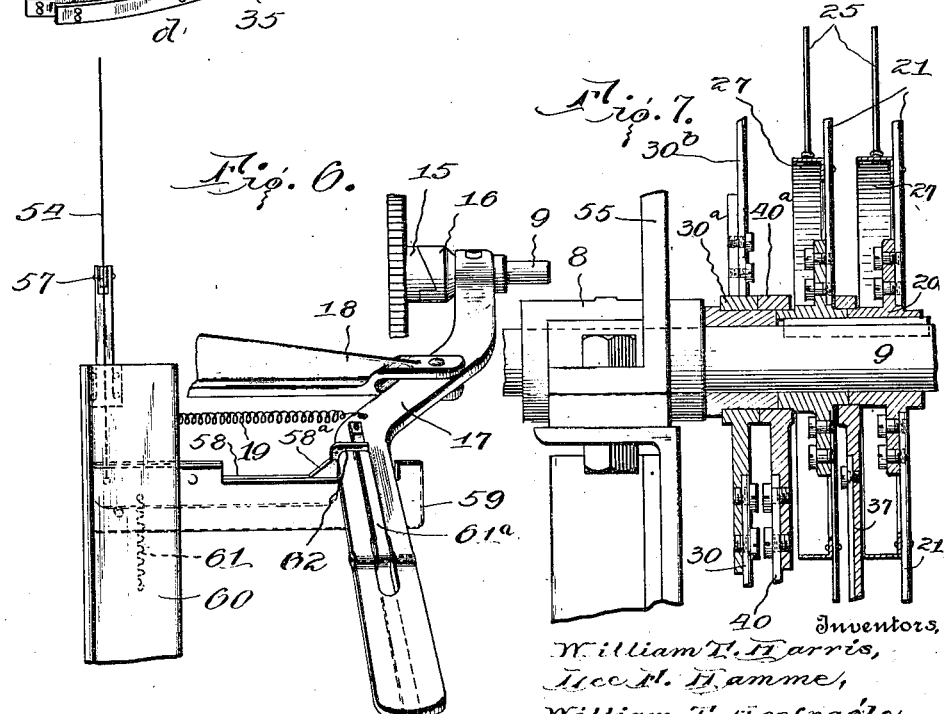

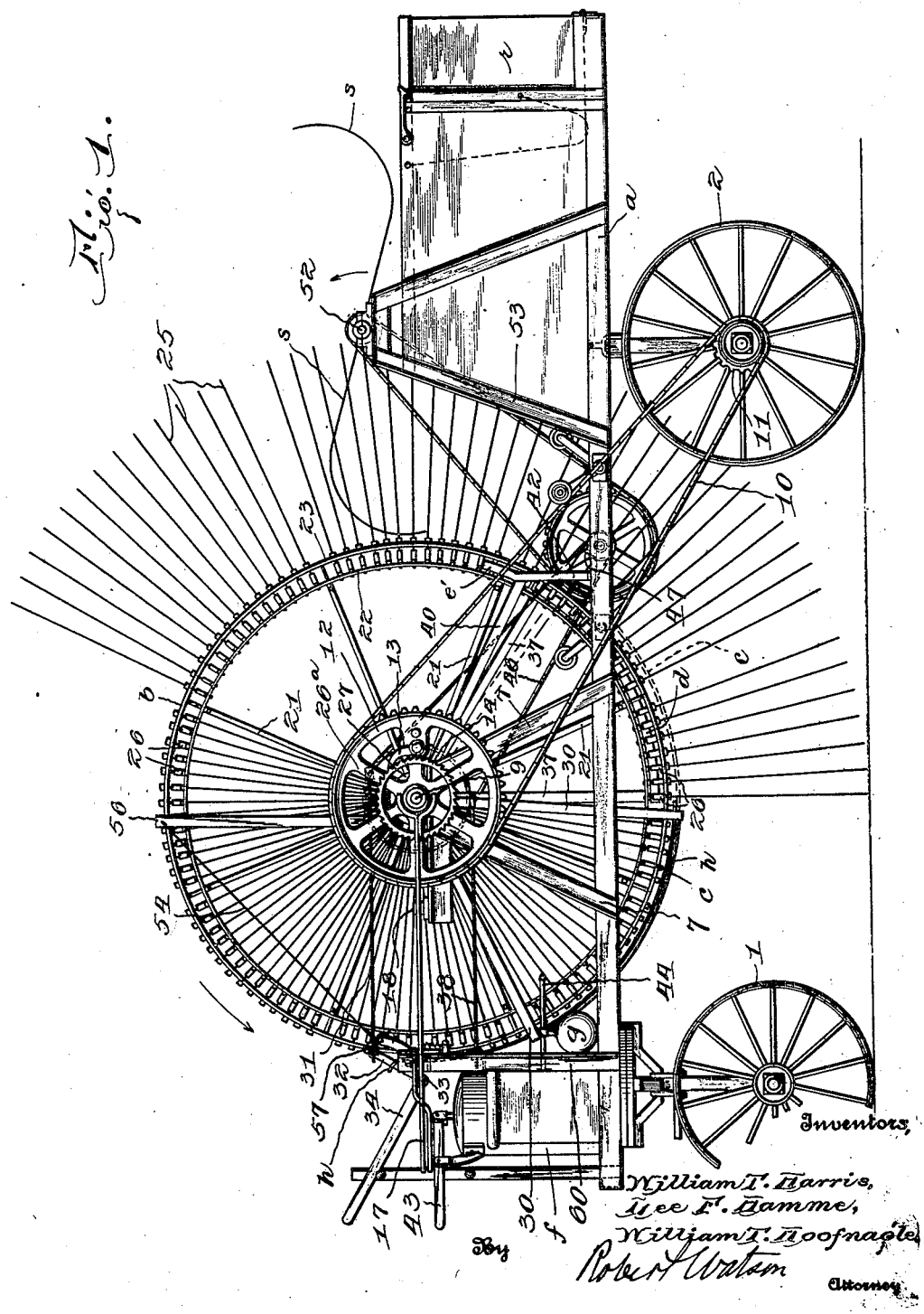

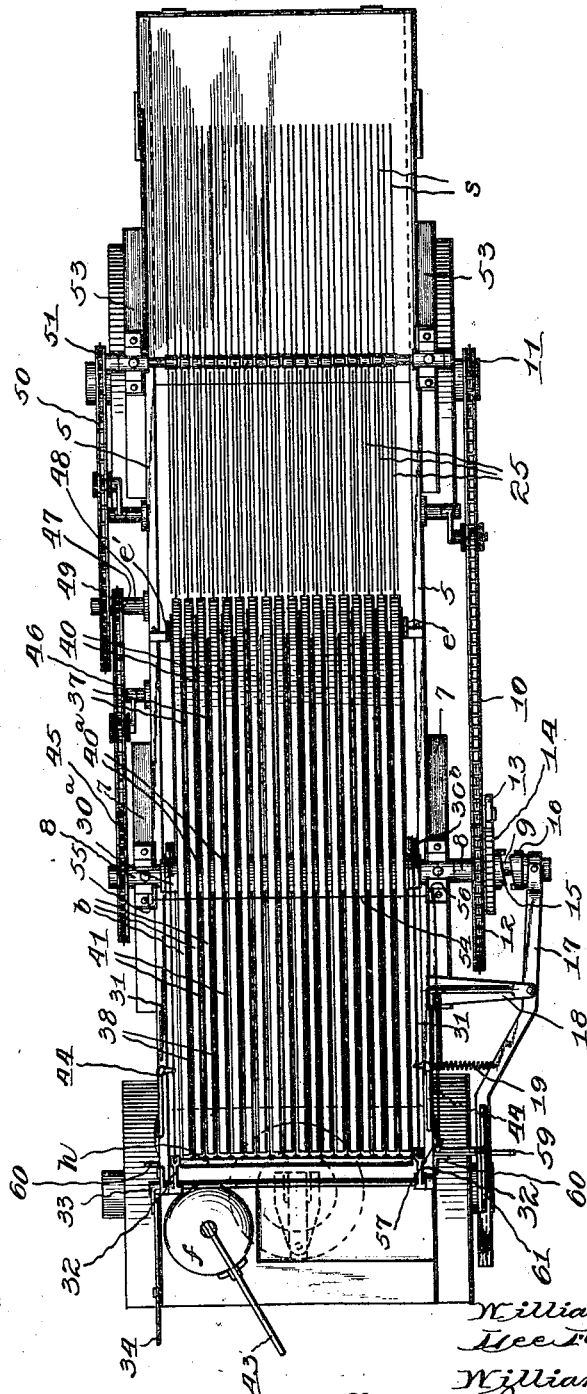

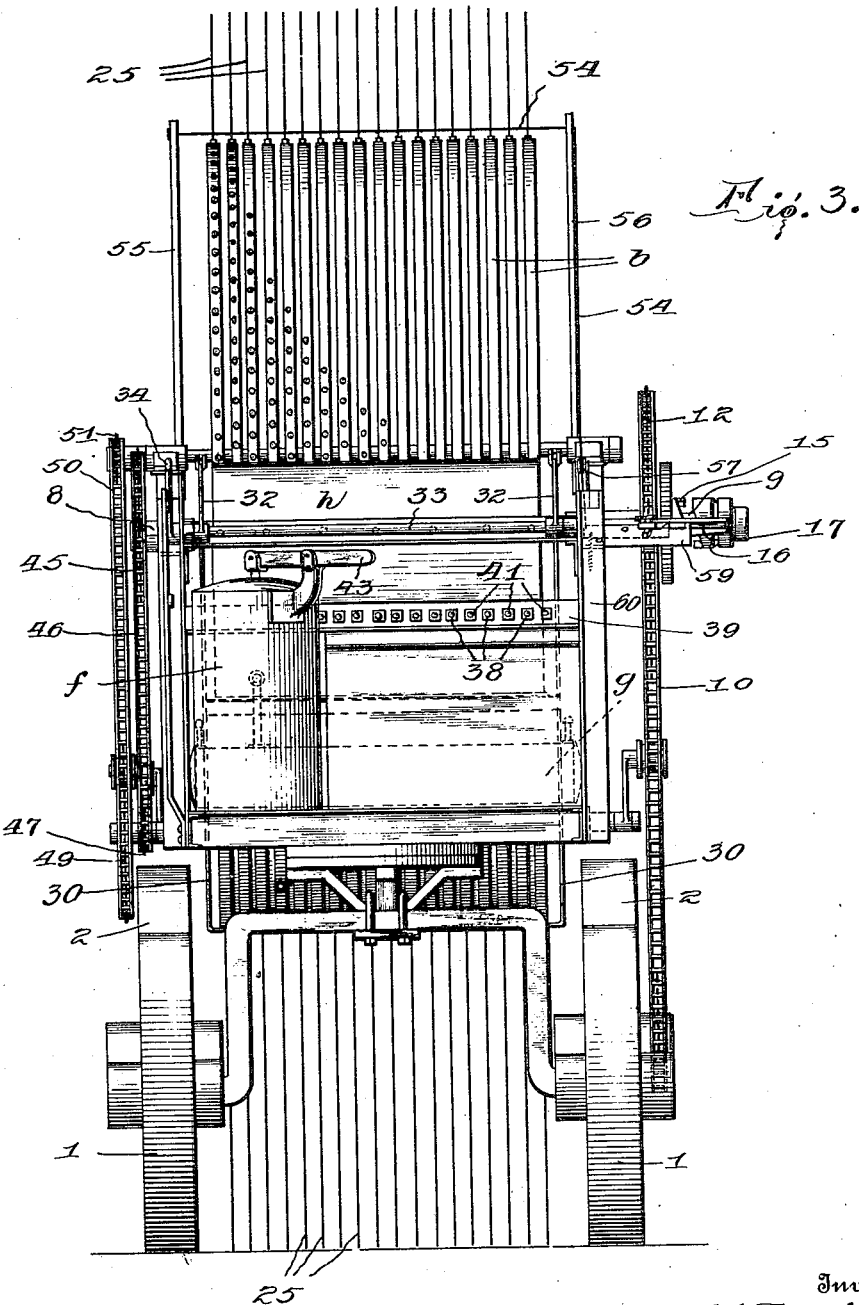

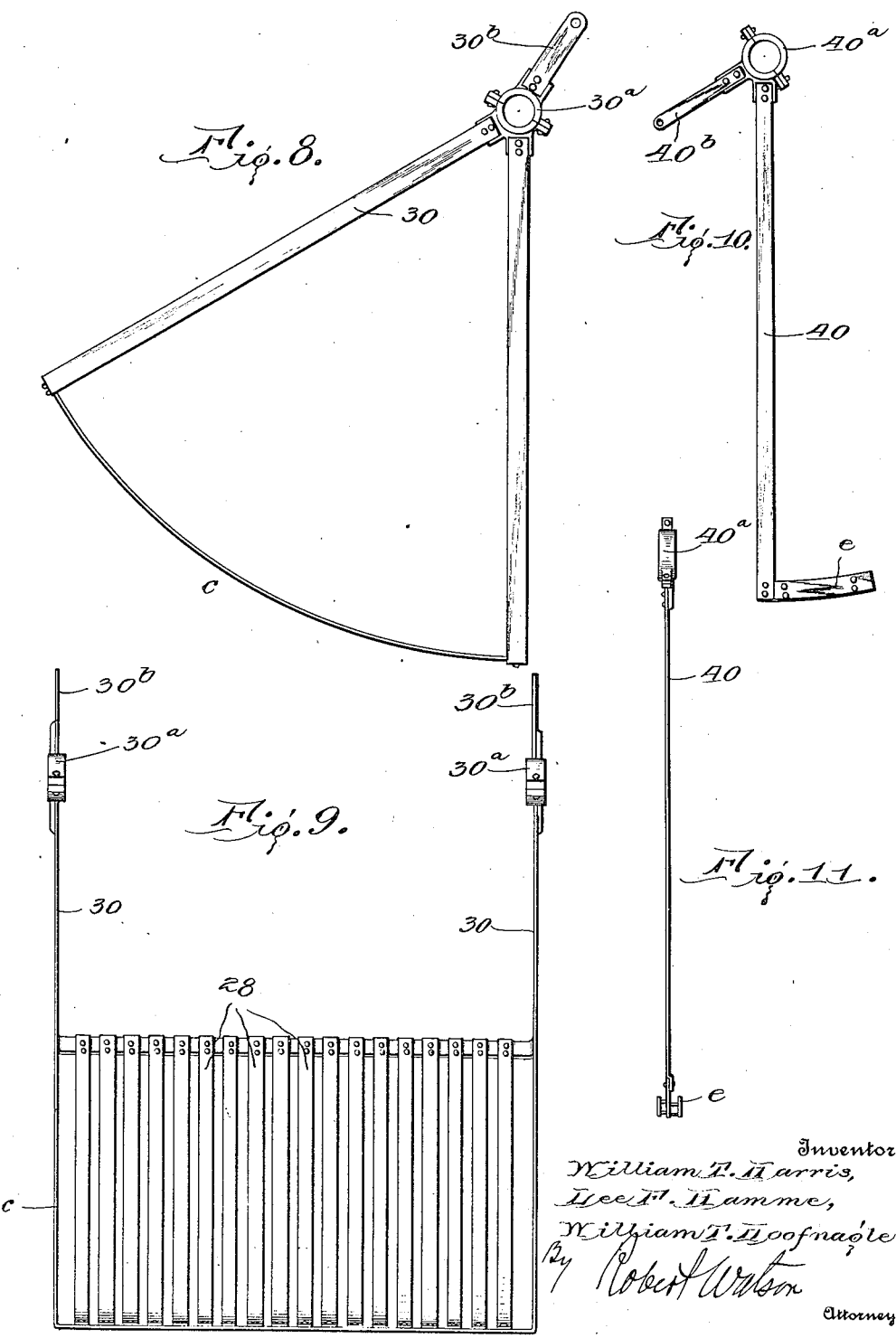

Patented May 8, 1923.

1,454,737

UNITED STATES PATENT OFFICE.

WILLIAM T. HARRIS, OF VIRGILINA, VIRGINIA, LEE F. HAMME, OF OXFORD, NORTH CAROLINA, AND WILLIAM T. HOOFNAGLE, OF GLEN RIDGE, NEW JERSEY.

COTTON-PICKING MACHINE.

Application filed January 6, 1922. Serial No. 527,433.

*To all whom it may concern:*

Be it known that we, WILLIAM T. HARRIS, LEE F. HAMME, and WILLIAM T. HOOFNAGLE, citizens of the United States, residing, respectively, at Virgilina, in the county of Halifax and State of Virginia; at Oxford, in the county of Granville and State of North Carolina; and at Glen Ridge, in the county of Essex and State of New Jersey, have invented certain new and useful Improvements in Cotton-Picking Machines, of which the following is a specification.

This invention relates to improvements in cotton picking machines, of the type illustrated in the prior patent to William T. Harris and Lee F. Hamme, No. 1,334,369, in which a plurality of pickers, in the form of needles, are arranged radially in carriers which rotate about a horizontal axis, and as the carriers rotate, the needles are dropped endwise into the cotton plants and rotated in one direction to pick the cotton, and then in the reverse direction to loosen the fibres on the needles so that the cotton may be stripped from the needles by stripping devices.

Heretofore, in machines having rotatable needles for picking the cotton, the needles have had roughened surfaces for engaging the fibres; but these needles engage and pick pieces of leaves and bark along with the cotton and the roughened surfaces also make it difficult to strip the picked cotton from the needles.

We have found that the cotton can be picked with needles having smooth surfaces if, prior to dropping the needles into the cotton plants, their surfaces are moistened with a liquid which the cotton fibres will quickly absorb, and which is not injurious to the cotton, preferably water. When the moistened rotating needle comes in contact with the cotton in the cotton boll, some of the fibres become wet and wrap around the needle and all of the cotton is pulled out of the boll; or, if the cotton is upon the ground the action is the same. The cotton thus gathered is rapidly stripped from the smooth needles by the stripping devices after reversing the direction of rotation of the needles to loosen the fibres from the needles.

In the machine of the present invention, therefore, we provide smooth picking needles and means for applying moisture to the needles to cause the cotton fibres to adhere thereto, the advantages of which are stated above. We also mount the needles in the carrier in such manner that the diameters of the carriers and the lengths of the needles are greatly reduced over what is required in the machine of our former patent. The invention further includes means for automatically stopping the rotation of the carriers in case a picker needle fails to return to its inner position in the carrier at the proper time, and it also includes certain details of construction hereinafter more particularly described.

In the accompanying drawing,

Fig. 1 is a side elevation of a cotton picking machine embodying our improvements;

Fig. 2 is a top plan view of the same;

Fig. 3 is a front elevation of the machine;

Fig. 4 is a perspective view of portions of two adjacent carriers and of the rails for causing the rotation of the needles in said carriers;

Fig. 5 is a detail view showing the inner end of one of the needles and its mountings in the rings of a carrier;

Fig. 6 is a top perspective view of the clutch operating devices;

Fig. 7 is a sectional detail showing a portion of the main shaft and parts mounted thereon;

Fig. 8 is a side elevation of the retainer which supports some of the picking needles while the machine is traveling over the roads;

Fig. 9 is a rear view of the retainer, looking from right to left in Fig. 8;

Fig. 10 is a side view of one of the units for reversing the rotation of the needles; and, Fig. 11 is an edge view of the same, looking from right to left in Fig. 10.

Referring to the drawing, *a* represents the frame of the picker, which is mounted upon front and rear wheels 1 and 2, for transportation through the cotton fields and over the roads. The frame comprises side bars 5, to which are secured upwardly projecting standards 7, having bearings 8 at their upper ends in which is mounted a main shaft 9, which carries the picking mechanism. This shaft is operated in the direction of the arrow, Fig. 1, by a drive chain 10, which engages a sprocket wheel 11, on one of the rear wheels 2, and extends around a larger sprocket wheel 12, which is loosely mounted on the shaft 9. The sprocket wheel 12 carries a pawl 13, which engages a ratchet wheel 14, which is also loosely mounted on the shaft 9, and the hub of the ratchet wheel is shaped to form a clutch member 15, adapted to be engaged by a complementary clutch member 16, which is splined to the shaft. This latter member is movable into and out of engagement with the member 15 by a clutch lever 17, pivoted upon a bracket 18, but normally held in its dis-engaged position by a spring 19. The clutch member is provided with locking means, hereinafter described, for holding the clutch members in their engaged positions.

With the arrangement shown, when the clutch is engaged, if the machine is moved along the ground in the forward direction, the sprocket wheel 12 will be driven by the rear vehicle wheel 2, and the ratchet wheel 14, clutch members and the shaft 9 and parts thereon will be driven by the pawl 13 on the wheel 12. If the machine is moved in a backward direction, however, the pawl will slide over the teeth of the ratchet wheel and the shaft 9 and parts thereon will not be driven. If the clutch be dis-engaged, the machine can be moved from place to place without causing the rotation of the shaft 9.

Upon the shaft 9 are mounted a plurality of annular carriers $b$, each comprising a hub 20, (Fig. 7) radial spokes 21, and a pair of flat rings or bands 22 and 23, mounted upon the ends of the spokes and spaced a short distance apart, one within the other. These bands have spaced perforations, alined radially, throughout their lengths, and in these perforations are fitted bushings 24, (Fig. 5) in which are slidably and rotatably mounted picker needles or fingers 25. Upon each needle, between the bands, is mounted a short tube 26 of yieldable material, preferably rubber, having a bore of slightly greater diameter than the diameter of the needle, in order that the needle may slide freely through the tube. The surfaces of the needles are smooth throughout their lengths, and each needle has a head $25^a$ at its inner end which serves as a stop to limit the outer radial movement of the needle. Each carrier is provided with a drum 27, secured to its spokes near its axis, (Figs. 1 and 7) and this drum forms a stop or rest against which the inner ends of the needles rest during part of a revolution of the carrier.

In the prior patent above referred to the carriers are shown with inner and outer rings spaced a considerable distance apart radially of the carrier, and the spools for rotating the needles are fixed to the needles between said rings. This necessitates making the needles very long and the carriers of large diameter, as the needles are required to drop below the carrier for a length equal to the height of the cotton plants, and the travel of the spools between the rings must be equal to this drop. By allowing the needles to slide through the spools for nearly their full lengths, as in the present invention, the needles may be shortened practically one-half and the outer ring may be brought close to the inner ring, thus greatly reducing the diameters of the carriers.

A stationary guard or retainer $h$, consisting of a curved plate suitably supported at the front of the machine and extending around the lower forward quarters of the carriers, prevents the needles from dropping down until they are at a point approximately beneath the axis of the carriers.

A movable retainer $c$ is provided for supporting the needles at the rear of the stationary guard while the machine is traveling over the roads or through the fields and not being used for picking cotton. This retainer, as shown in Figs. 8 and 9, comprises a series of parallel curved strips 28, connected to cross-pieces 29, which are secured to hangers 30, having bearings $30^a$ journaled on the shaft 9 at the sides of the carriers. The hangers have arms $30^b$ extending above their bearings and connected by rods 31 to crank arms 32, fixed to a rock shaft 33 which is mounted in suitable bearings at the front of the machine. This shaft may be rocked by the lever 34 to adjust the position of the retainer from that shown in full lines, Fig. 1 where it lies parallel with the guard $h$, to the position shown in dotted lines at the rear of said guard. This adjustment is made while the carriers are rotating, and after the retainer is in position to support the needles the carriers are stopped.

Between alternate carriers and extending rearwardly from the guard $h$, are relatively long arcuate rails $d$, adapted to bear against the elastic tubes 26 on the needles of the adjacent carriers and by their pressure to cause the tubes to frictionally bind upon the needles and rotate the same. Between the intermediate carriers are other similar but shorter rails $e$, which engage the tubes on the needles, after they have left the rails $d$, and cause the tubes to rotate the needles in the reverse directions. As shown in Fig. 4, each rail $d$ comprises two arcuate strips 35, secured to an intermediate strip 36, which is connected at its ends to a hanger 37, suspended from the shaft 9. Stay rods 38 extend from the hangers 37 to a bar 39 at the front of the machine and hold the hangers and the rails thereon stationary with respect to the carriers. The rails $e$ extend upwardly from the ends of radial rods 40, which have bearings $40^a$ on the shaft 9, and levers 40$^b$, projecting downwardly from said bearings, are connected by stay rods 41 to the bar 39, whereby the rails are held stationary with respect to the carriers. The outer reversing rails $e'$, each of which bears against the tubes or rollers on one carrier only, are braced laterally by uprights 42, secured to the side bars of the machine.

With the arrangement above described, it will be evident, that while the machine is moving forward, the needles at the upper part of the carrier will drop inward against the drums 27 and as they move past a horizontal position will drop against the guard $h$, and then off of said guard and into the cotton plants. After dropping from the guard, they are rotated by the rails $d$, to pick the cotton, and as the needles lift out of the cotton plants at the rear sides of the carriers, they are rotated in the opposite direction by the short rails $e$, which causes the fibres to loosen on the needles. The cotton is then stripped from the needles by strippers $s$ and thrown into a receptacle $r$, as hereinafter explained. The needles after being stripped, drop inward by gravity on to the drums 27, as the needles approach the tops of the carriers.

The needles, as hereinbefore stated, have smooth surfaces and would not pick the cotton if the needles were perfectly dry; but we have found that by moistening the needles before they drop into the cotton plants, any cotton fibres with which the needles come in contact will be wrapped around the needles, and that the moistened smooth needles will pick the cotton satisfactorily. Heretofore, roughened needles have been used to pick the cotton; but the roughened pickers also pick particles of leaves which become intermixed with the cotton, and besides it is difficult to strip the cotton from the roughened pickers. One of the principal advantages of picking with moistened smooth needles is that the cotton strips off of the pickers perfectly, and another advantage is that such needles do not readily pick the foreign substances.

For moistening the needles, we provide a suitable air tank $f$, and a pump (not shown) operated by a handle 43, for compressing the air in said tank, and we also provide a water tank $g$, these tanks having pipe connections to the sprayer heads 44, arranged at opposite sides of the machine and adapted to direct a fine spray inwardly against the picking needles to moisten them. This spray is applied to the pickers near their outer ends, before they drop off of the guard, and the elastic tubes through which the needles drop also become moistened and spread the moisture over the surfaces of the needles.

The shaft 9 carries a sprocket wheel 45, which is connected by a sprocket chain 46 to a sprocket wheel 47, on a stud 48, projecting from the main frame. The wheel 47 is secured to a larger sprocket wheel 49, which is connected by a chain 50 to a sprocket wheel 51, on a shaft 52 which is supported in bearings upon standards 53, at the rear of the carriers. This shaft carries a series of wire strippers $s$, curved as shown in Fig. 1, which rotate in the direction of the arrow in said figure. There are, as shown in Fig. 2, two of these strippers for each series of needles, arranged upon opposite sides of the needles. These strippers remove the cotton from the needles and throw it rearwardly into a suitable receptacle $r$.

As the machine moves forwardly over the rows of cotton plants, the needles drop from the guard into the plants, and are rotated to pick the cotton. As the needles rise above the plants, their direction of rotation is reversed and then the strippers remove the cotton from the needles. The needles then move upward until they are nearly in a vertical position, when they fall inward by gravity and rest against the drums 27, until they pass below the forward horizontal position when they slide out against the guard or retainer and then drop into the cotton plants again. If the machine is moved backward, the pawl 13 will slide over the ratchet wheel 14 and the carriers will not be rotated. Hence, no injury to the needles can occur through backward movement of the machine.

Should any one of the needles not drop inwardly when passing over the center of the carrier, this needle would strike against parts on the front of the machine and become bent or broken. To guard against this, we provide means whereby the projecting needles will trip the clutch and cause the immediate stoppage of the carriers: As shown in Figs. 1, 2, and 3, a cord or flexible cable 54 is secured to an upright 55, projecting from one of the bearings 8, and this cord extends over the several carriers and passes through an eye in a similar upright 56, secured to the bearing 8 on the opposite side of the machine and thence downwardly and forwardly over a pulley 57, and is connected to one end of a latch 58, which is pivoted centrally on an arm 59, projecting laterally outward from an upright 60 at the front of the machine. The clutch lever 17 rests on this arm, as shown in Fig. 6, and when the lever is moved to engage the clutch, a projection 58$^a$ on the latch springs up at the side of the lever and holds the lever in the engaging position against the action of the spring 19. If a high needle engages the part of the cord which extends horizontally over the carriers, the cord will be pulled by the needle and the latch will be rocked against the action of its spring 61 to release the clutch lever, and the spring 19 will rock said lever to disengage the clutch, whereupon the carriers will stop and injury to the needle or other parts will be avoided. When the clutch is moved to the right, in Fig. 6, to engage the clutch members, it rides over the inclined face of the projection 58ª and depresses the latch, and this projection then springs up behind the lever and locks it. When it is desired to stop the operation of the carriers, the latch can be depressed to release the clutch lever by means of a lever 61ª, pivoted to and extending longitudinally of the clutch lever, this lever having a lateral projection 62, adapted to bear upon the projection 58ª and depress the latch.

What we claim is:

1. In a cottom picking machine, a plurality of smooth surfaced picking needles, means for moistening the needles, means for lowering said needles endwise into the cotton plants and for raising them from the plants, means for rotating the needles in one direction when lowered and in the opposite direction when raised, and means for stripping the cotton from the needles.

2. In a cotton picking machine, a carrier rotatable about a horizontal axis, a plurality of smooth surfaced picking needles radially movable in said carrier, means for moistening the needles, means for causing the needles to drop vertically into the cotton plants, means for rotating the needles in one direction when lowered, and in the opposite direction when raised from the plants, and means for stripping the cotton from the needles.

3. In a cotton picking machine, an annular carrier rotatable about a horizontal axis, means for rotating the carrier, picking needles radially movable in said carrier, relatively short tubes of yieldable material through which the needles are movable, means for causing the needles to drop into the cotton plants, a rail at one side of the carrier adapted to bear against said tubes while the needles are lowered into the plants, a rail at the opposite side of the carrier adapted to bear against said tubes when the needles are raised from the plants, and means for stripping the cotton from the needles.

4. In a cotton picking machine, a horizontal shaft and means for rotating the same, a carrier on said shaft comprising two rings, one within the other, picking needles radially movable through said rings, relatively short tubes surrounding the needles between said rings, said needles being movable through the tubes and rails at opposite sides of the carrier adapted to bear against said tubes in succession as the carrier rotates.

5. In a cotton picking machine, an annular carrier rotatable about a horizontal axis, means for driving said carrier including a clutch, a latch for holding said clutch in its engaging position, picking needles mounted in said carrier and movable by gravity toward and from its axis, and means for tripping the latch including a part extending over the carrier in the path of movement of the needles.

6. In a cotton picking machine, an annular carrier rotatable about a horizontal axis, means for driving said carrier including a clutch, a latch for holding said clutch in its engaging position, picking needles mounted in said carrier and movable by gravity toward and from its axis, and means for tripping the latch including a flexible member extending over the carrier in the path of movement of the needles.

7. In a cotton picking machine, a wheeled body, a horizontal shaft thereon, a plurality of carriers mounted on the shaft, each carrier comprising two rings, one within and adjacent the other and a drum adjacent the shaft, needles radially movable through said rings and adapted, in their inner positions to rest against said drum, tubes on said needles between the rings, said needles being movable through the tubes and rails adapted to bear against said tubes during part of the revolution of the carriers.

8. In a cotton picking machine, a wheeled body, annular carriers mounted thereon and rotatable about a horizontal axis, picking needles radially movable in said carriers, a stationary guard extending parallel with the lower forward quarters of said carriers and adapted to prevent outward movement of the needles until they reach a point beneath the axis of the carriers, and a retainer normally lying parallel with said guard and movable into position to support the needles in the rear lower quarters of the carriers.

In testimony whereof, we affix our signatures.

WILLIAM T. HARRIS.
LEE F. HAMME.
WILLIAM T. HOOFNAGLE.